No. 878,122. PATENTED FEB. 4, 1908.
J. COSTELLO.
JEWELER'S CHAIN AND BEAD STOCK.
APPLICATION FILED JULY 30, 1907.

WITNESSES: INVENTOR:

UNITED STATES PATENT OFFICE.

JOHN COSTELLO, OF PROVIDENCE, RHODE ISLAND.

JEWELER'S CHAIN AND BEAD STOCK.

No. 878,122.  Specification of Letters Patent.  Patented Feb. 4, 1908.

Application filed July 30, 1907. Serial No. 386,264.

*To all whom it may concern:*

Be it known that I, JOHN COSTELLO, a citizen of the United States, residing at Providence, in the county of Providence and State of Rhode Island, have invented a new and useful Improvement in Jewelers' Chain and Bead Stock, of which the following is a specification.

This invention has reference to an improvement in jewelers' chain stock and more particularly to an improvement in jewelers' bead chain stock for making rosaries, necklaces or similar articles of bead jewelry.

In bead chain stock as heretofore constructed for making rosaries or similar articles, the spaced beads are usually secured to the chain in the required spaced positions by rings soldered to the chain at each side of the beads or by a plurality of loose rings on the chain intermediate the beads. In practice I find that soldering the rings to the chain is costly and detrimental, particularly when the beads are of glass or other material easily affected by heat, and the use of a plurality of rings between the beads increases the cost of manufacturing the stock.

The object of my invention is to improve the construction of bead chain stock for rosaries or similar articles, whereby the beads are securely held on the chain in a spaced position without the use of solder or a plurality of loose rings between the beads, thereby improving the quality and appearance of the bead chain stock and reducing the cost of manufacturing the same.

My invention consists in the peculiar and novel construction of bead chain stock for rosaries, necklaces or similar articles, said bead chain stock having details of construction, as will be more fully set forth hereinafter and claimed.

Figure 1:
Figure 2:
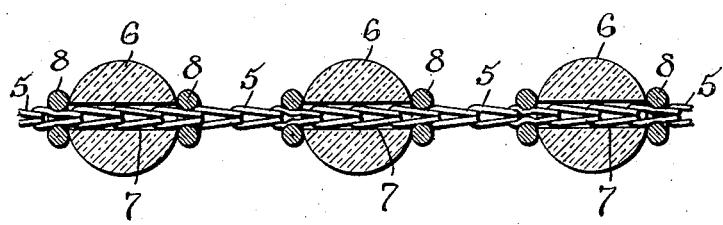
Figure 3:
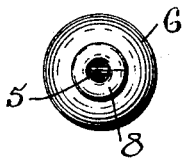

Figure 1 is a face view of a piece of my improved bead chain stock, showing the beads spaced on the chain and held in the spaced position by a ring on the chain at each side of the bead. Fig. 2 is an enlarged longitudinal sectional view through the bead chain stock, showing the rings at each side of the beads embedded in the chain by clamping the rings onto the chain, and Fig. 3 is an enlarged view of the bead chain stock looking at the end of the same and showing one of the split rings for holding the beads in the spaced position on the chain.

In the drawings, 5 indicates a flexible compact chain which may be constructed in any well known way, 6 6 a series of beads which may be constructed of glass or other material, each bead having a perforation 7 for the chain 5, and 8 8 a series of split rings adapted to be clamped onto the chain 5. The beads 6 6 are held on the chain 5 in the required spaced position by clamping a split ring 8 onto the chain at each side of a bead, as shown in Fig. 2. In clamping the rings 8 8 onto the chain, the rings are embedded in the chain, thereby holding the beads in the spaced position and securely fastening the rings to the chain, without the use of solder.

It is evident that any form of chain or beads may be used and that the beads may be irregularly spaced if desired, without materially affecting the spirit of my invention.

Having thus described my invention, I claim as new and desire to secure by Letters Patent;—

1. A chain bead stock comprising a chain, a series of spaced beads on the chain and a ring secured on the chain at each side of a bead.

2. A chain bead stock comprising a chain, a series of spaced beads on the chain, and a ring embedded in the chain at each side of a bead.

3. A chain bead stock comprising a compact flexible chain, a series of spaced beads on the chain, and a split ring embedded in the chain at each side of a bead.

4. In a chain bead stock, the combination of a chain 5, a series of beads 6 6 each bead having a perforation 7 for the chain 5, and a series of split rings 8 8 embedded in the chain 5, as described.

In testimony whereof I have signed my name to this specification in the presence of two subscribing witnesses.

JOHN COSTELLO.

Witnesses:
ADA E. HAGERTY,
J. H. MILLER.